United States Patent Office.

EMILE LOISEAU AND CHARLES F. REGUIN, OF NASHVILLE, TENNESSEE.

*Letters Patent No. 78,982, dated June 16, 1868.*

IMPROVED ARTIFICIAL FUEL.

*The Schedule referred to in these Letters Patent and making part of the same.*

TO ALL WHOM IT MAY CONCERN:

Be it known that we, EMILE LOISEAU and CHARLES F. REGUIN, of Nashville, in the county of Davidson, and State of Tennessee, have invented a new and improved Fuel-Composition; and we do hereby declare that the following is a full, clear, and exact description thereof, which will enable others skilled in the art to make and use the same.

This invention relates to a new composition for utilizing coal-dust, and for producing a valuable fuel for heating purposes.

The composition consists of the following ingredients, in about the proportions set forth:

Eight thousand parts of coal-dust.
Two hundred parts of clay.
Three parts of saleratus, (bicarbonate of potash.)
Six parts of shellac.

The shellac and saleratus are dissolved in about one hundred and twelve parts of boiling water, and after they are dissolved, they are mixed with four hundred parts of cold water.

The coal-dust and the clay are mixed with the aforesaid mixture, so as to form a pasty mass, which may be moulded in suitable forms by mechanical pressure.

Before moulding, the composition must be well worked, turned, and stirred, so as to mix all the ingredients well together.

The lumps are, after moulding, dried, and are then ready for use.

By this invention, the owners of coal-mines will be able to produce from the now valueless coal-dust a cheap and useful fuel, which will be of great advantage both to the owners of coal-mines and to the consumers.

Having thus described our invention, what we claim as new, and desire to secure by Letters Patent, is—

A composition for fuel, consisting of the ingredients herein shown and described.

EM. LOISEAU,
CHS. FC. REGUIN.

Witnesses:
W. H. SLOAN,
JAMES KYLE.